J. C. AND W. A. JEWETT.
INSECT CATCHING AND KILLING DEVICE.
APPLICATION FILED SEPT. 3, 1913.
1,308,952.
Patented July 8, 1919.
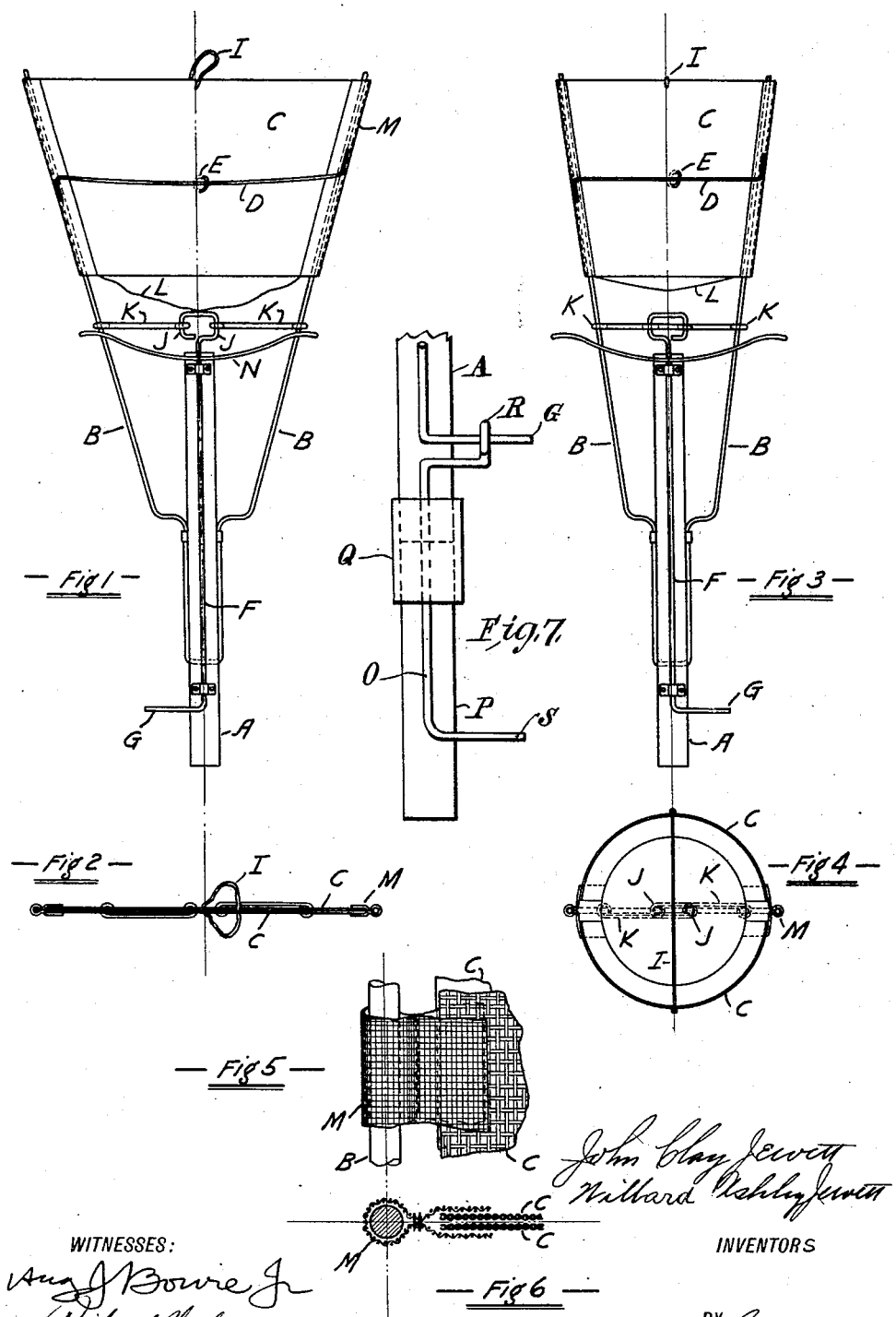

UNITED STATES PATENT OFFICE.

JOHN CLAY JEWETT AND WILLARD ASHLEY JEWETT, OF SAN FRANCISCO, CALIFORNIA, ASSIGNORS, BY MESNE ASSIGNMENTS, OF ONE-HALF TO AUGUSTUS J. BOWIE, JR., AND ONE-HALF TO JOHN F. BARNETT.

INSECT CATCHING AND KILLING DEVICE.

1,308,952.   Specification of Letters Patent.   Patented July 8, 1919.

Application filed September 3, 1913. Serial No. 787,879.

*To all whom it may concern:*

Be it known that we, JOHN CLAY JEWETT and WILLARD ASHLEY JEWETT, citizens of the United States of America, residing at the city and county of San Francisco, State of California, have invented certain new and useful Improvements in Insect Catching and Killing Devices; and we do hereby declare the following to be a full, clear, and accurate description of the invention, such as will enable others skilled in the art to which it appertains to make and use the same.

This invention relates to a new and useful insect catching and killing device. It has particular reference to the catching and killing of insects which fly, such as flies, moths and mosquitos. It is the object of this invention to kill the insects with a blow of sufficient force, which however, will not mash the insects, and to retain them and prevent them from falling. To accomplish this result we employ a casing adapted to be put over the insect to be destroyed.

This casing is provided with an opening adapted to be readily placed over the insect. The surrounding surface of the casing is adapted to be suddenly collapsed upon itself in such a way that the blow of collapsing will kill the insect within. It is essential that the sides of the casing completely collapse and hence leave no material space between the sides thereof, so as to strike together with a blow that will strike the insect, thereby injuring or killing it.

The invention in its preferred form is shown in the figures. Figure 1 shows the elevation of the device closed, and Fig. 2 shows an end view of the same. Fig. 3 shows an elevation of the device open, and Fig. 4 an end view of the same. Fig. 5 shows elevation of a hinge of the sides of the casing and Fig. 6 a section of a hinge where the parts of the casing are joined. Fig. 7 shows an elevation of an extensive handle for lengthening the operating handle.

A rigid handle A has securely fastened to it two flexible wires B, B adapted by spring tension to diverge from each other. These wires carry at their outer ends two pieces of wire netting C, C adapted to be substantially in contact when the wires are distended as shown in the drawing. Secured to the wires B, B are two springs D, D which likewise tend to cause said wires B, B to diverge. These springs D, D are fastened by strings E, E respectively, to the netting C, C. F is a shaft with lever G mounted on the handle A. The outer end of the shaft F is bent so as to provide two pins J, J adapted for attachment of links K, K, which links are likewise connected to the wires B, B. N is a wire or bar which is secured to the handle A, and embraces the wires B, B, on both sides, thus serving as a guide for the wires and preventing lateral motion.

When the handle G is turned it will cause wires B, B to draw in toward each other and by so doing will cause opening of the casing which will then assume the position shown in Figs. 3 and 4. In order to secure efficient operation, it is necessary that the sides of the casing C, C be constructed of material like wire screen, as it would be impracticable to employ any kind of solid material which would not allow the air to pass readily through it, since it is essential that the closure of the casing be effected quickly and without substantial air resistance as otherwise the insect would be projected outward from the casing by the outrush of air.

The lower end of the casing is provided with a flexible net L, adapted to allow opening of the casing to the position shown in Fig. 3. The lever G must be held in an open position for operation during which the casing C, C is put over the insect to be killed. When the lever G is released the combined effect of springs B and D will cause the sides of the casing to collapse and whip together, the blow being sufficient to kill the insect within, but not to crush it.

The net L prevents the insect when dead from falling. If desired the shaft F may be provided with a retaining latch to hold the casing in an open position, adapted to be released by being tripped, but it is generally preferable to operate the same without this attachment. Any other means may be adopted for accomplishing the same result, namely, the drawing together of the rods B, B and collapsing of the casing C, C.

By arranging the shaft F to revolve through 180 degrees as shown, the casing will remain in an open position without a trigger and may be tripped by slightly touching the lever G. If desired an extension handle P, shown in Fig. 7, may be used for lengthening the handle A. Provision may also be made for extending the shaft F down this extension handle by any type of shaft coupling. Q is a socket which connects the handles A and P, so that handle P will form substantially a continuation of the handle A. O is a shaft extension provided at its upper end with an eye R, which embraces the end of handle G. The lower end of this shaft O, is made into a handle S, similar to G.

In order to scare the flies or insects into the casing, a string I is provided, joining the centers of outer edges of the netting C, C. In order to work effectively it is necessary for the casing sides to be very flexibly joined together and for this purpose we employ cloth hinges M which are sewed to the wire mesh. Stiffness of the joint is very undesirable and our construction avoids this objection.

We have described our invention in what we consider the most desirable form but the claims should not be limited to this particular form of device illustrated.

What we claim is:

1. An insect injuring or killing device consisting of a casing adapted to encircle an insect, an opening into said casing, and means for completely collapsing said casing, thereby injuring or killing said insect.

2. An insect injuring or killing device consisting of a casing having two openings into same, flexible material closing one of said openings and means for completely collapsing said casing.

3. In an insect injuring or killing device a casing, an opening into said casing, means for collapsing said casing, said means being adapted to cause opposing parts of said casing to strike together.

4. In an insect injuring or killing device a casing adapted to be completely collapsed, means for opening said casing, entrance into said casing being permitted when so opened and means for collapsing said casing.

5. In an insect injuring or killing device a casing consisting of flexible sides adapted to be completely collapsed, means for opening said casing so as to provide entrance into the same, in combination with means for collapsing said casing suddenly.

6. In an insect catching and killing device a casing having sides adapted to be held in a completely collapsed position, the sides of said casing consisting of flexible material attached to supporting members, means for causing said supporting members to be drawn together and to provide an opening into said casing, and means for collapsing said casing.

7. In an insect catching and killing device a flexible casing consisting of two halves adapted to be collapsed, of supporting members attached to said halves, springs attached to said supporting members, connections respectively between said springs and halves of said casing, said connections being adapted to cause said halves to bend in opposite directions when the casing is opened, so as to provide an opening into said casing when said supporting members are so drawn together, and means for collapsing said casing.

8. In an insect catching and killing device a casing, an opening into said casing, a flexible connection spanning said opening adapted to disturb insects when on a wall or other resting place and thereby to cause said insects to enter said casing and means for collapsing said casing.

9. In an insect catching and killing device a casing having sides adapted to be held in a collapsed position, the sides of said casing consisting of flexible material attached to supporting members, a shaft provided with crank pins, links connecting said pins with said supporting members, the rotation of said shaft being adapted to cause said supporting members to be drawn together and to provide an opening into said casing, and means for collapsing said casing.

In testimony whereof we have hereunto affixed our signatures in the presence of two witnesses.

JOHN CLAY JEWETT.
WILLARD ASHLEY JEWETT.

Witnesses:
 HENRY F. PIERCE,
 F. D. CUSHING.

Copies of this patent may be obtained for five cents each, by addressing the "Commissioner of Patents, Washington, D. C."